US011531661B2

(12) United States Patent
Catalano et al.

(10) Patent No.: US 11,531,661 B2
(45) Date of Patent: Dec. 20, 2022

(54) VEHICLE INCIDENT DOCUMENTATION FOR BLOCKCHAIN

(71) Applicant: International Business Machines Corporation, Armonk, NY (US)

(72) Inventors: Pasquale A. Catalano, Wallkill, NY (US); Andrew G. Crimmins, Montrose, NY (US); Byron S. Green, Poughkeepsie, NY (US); Arkadiy O. Tsfasman, Wappingers Falls, NY (US); John S. Werner, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 242 days.

(21) Appl. No.: 15/937,218

(22) Filed: Mar. 27, 2018

(65) Prior Publication Data

US 2019/0303463 A1    Oct. 3, 2019

(51) Int. Cl.
*G06F 16/22* (2019.01)
*G06Q 40/08* (2012.01)

(52) U.S. Cl.
CPC ............ *G06F 16/22* (2019.01); *G06Q 40/08* (2013.01)

(58) Field of Classification Search
CPC ................................ G06F 16/22; G06Q 40/08
See application file for complete search history.

(56) References Cited

U.S. PATENT DOCUMENTS

| | | | |
|---|---|---|---|
| 6,738,697 B2 | 5/2004 | Breed | |
| 7,284,769 B2 | 10/2007 | Breed | |
| 8,825,277 B2 | 9/2014 | McClellan et al. | |
| 9,773,281 B1* | 9/2017 | Hanson | G06Q 40/08 |
| 9,990,504 B1* | 6/2018 | Chapman | G06F 21/645 |
| 10,319,039 B1* | 6/2019 | Konrardy | G06Q 40/08 |
| 10,521,780 B1* | 12/2019 | Hopkins, III | G06Q 20/10 |
| 10,839,015 B1* | 11/2020 | Leise | G07C 5/008 |
| 2003/0233261 A1 | 12/2003 | Kawahara et al. | |
| 2004/0030587 A1 | 2/2004 | Danico et al. | |
| 2004/0088090 A1 | 5/2004 | Wee | |
| 2005/0278082 A1 | 12/2005 | Weekes | |
| 2008/0183485 A1* | 7/2008 | Drabble | H04W 4/021 705/1.1 |
| 2014/0300739 A1 | 10/2014 | Mimar | |
| 2014/0368601 A1* | 12/2014 | deCharms | H04W 4/021 348/14.02 |
| 2017/0220998 A1 | 8/2017 | Horn et al. | |

(Continued)

FOREIGN PATENT DOCUMENTS

WO    2017046805 A1    3/2017

OTHER PUBLICATIONS

A. Dorri, "BlockChain: A Distributed Solution to Automotive Security and Privacy," in IEEE Communications Magazine, vol. 55, No. 12, pp. 119-125, Dec. 2017.

(Continued)

*Primary Examiner* — Mark D Featherstone
*Assistant Examiner* — Ranjit P Doraiswamy

(57) ABSTRACT

An example operation may include one or more of receiving primary data from one or more vehicles, extracting first information from the primary data, creating one or more documents based on the extracted information, generating one or more blockchain transactions based on the one or more documents, and committing the one or more documents to a blockchain.

15 Claims, 10 Drawing Sheets

(56) References Cited

U.S. PATENT DOCUMENTS

2018/0018723 A1* 1/2018 Nagla .................. H04L 9/3236
2018/0060496 A1* 3/2018 Bulleit ................. H04L 9/3239

OTHER PUBLICATIONS

Anonymous, "A method for Motor Vehicle Insurance Claim Processing Automation using Simplified Block chain." IP.com Disclosure No. IPCOM000251638D, Publication Date: Nov. 20, 2017.

Anonymous, "A secure method of recording the history of a vehicle to a blockchain." IP.com Disclosure No. IPCOM000250889D, Publication Date: Sep. 12, 2017.

B. Gipp, "Securing Video Integrity Using Decentralized Trusted Timestamping on the Blockchain", in Proceedings of the 10th Mediterranean Conference on Information Systems (MCIS), Paphos, Cyprus, 2016. https://aisel.aisnet.org/mcis2016/51.

J. Shen, "Driving forward with IoT, big data and blockchain along for the ride." https://blogs.thomsonreuters.com/answerson/driving-forward-iot-big-data-blockchain-along-ride/Mar. 6, 2017 [Accessed Dec. 29, 2017].

K. Wang, "Blockchain is empowering the future of insurance," Oct. 29, 2016 https://techcrunch.com/2016/10/29/blockchain-is-empowering-the-future-of-insurance/ [Accessed Dec. 29, 2017].

Y. Yuan, "Towards blockchain-based intelligent transportation systems," 2016 IEEE 19th International Conference on Intelligent Transportation Systems (ITSC), Rio de Janeiro, 2016, pp. 2663-2668.

* cited by examiner

VEHICLE INCIDENT DOCUMENTATION FOR BLOCKCHAIN

TECHNICAL FIELD

This application generally relates to blockchain networks, and more particularly, relates to vehicle incident documentation for blockchains.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, incident transactions involving vehicles require fact-based investigation and analysis in order to determine incident cause and fault of driver(s). As such, what is needed is a blockchain-based process and system to overcome these limitations.

SUMMARY

One example embodiment may provide a system that includes one or more of one or more vehicles, including one or more sensors, and a plurality of nodes, configured to receive primary data from the one or more sensors. The plurality of nodes includes one or more of a server, configured to extract first information from the primary data, create one or more documents based on the extracted information, generate one or more blockchain transactions based on the one or more documents, and commit the one or more documents to a blockchain.

An example operation may include one or more of receiving primary data from one or more vehicles, extracting first information from the primary data, creating one or more documents based on the extracted information, generating one or more blockchain transactions based on the one or more documents, and committing the one or more documents to a blockchain.

A further example embodiment may provide a non-transitory computer readable medium comprising instructions, that when read by a processor, cause the processor to perform one or more of receiving primary data from one or more vehicles, extracting first information from the primary data, creating one or more documents based on the extracted information, generating one or more blockchain transactions based on the one or more documents, and committing the one or more documents to a blockchain.

DETAILED DESCRIPTION

Figure 1:
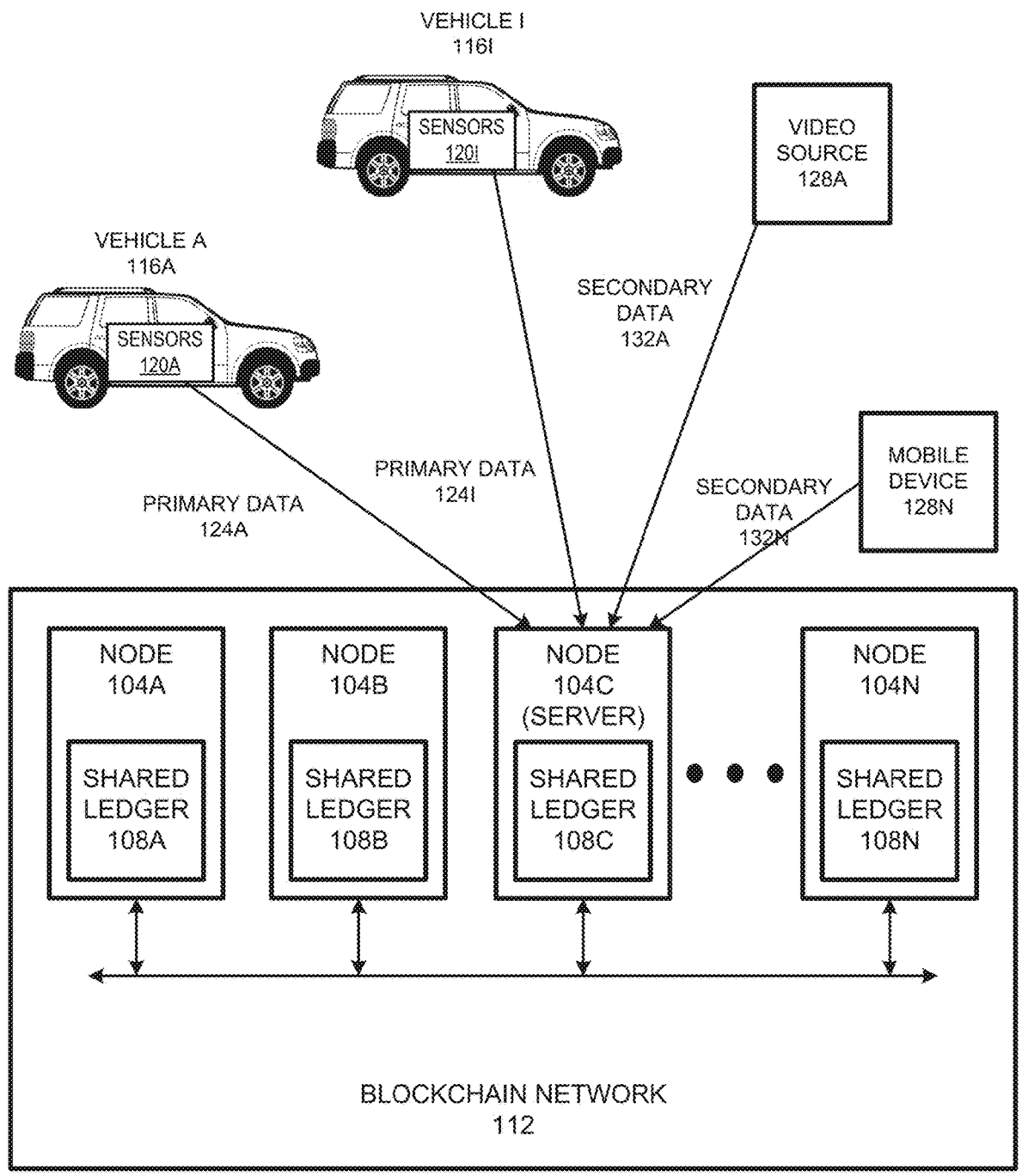
FIG. 1 illustrates a logic network diagram of a permissioned blockchain network, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiments. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to blockchain networks, and more in another embodiment relates to providing vehicle incident documentation for a blockchain. Example embodiments provide methods, devices, networks and/or systems, which support creating and storing documents on permissioned blockchain networks. Before proceeding to describing the proposed solution, the choice of blockchain implementation that can be used is discussed. While many implementations of blockchain technology for generic document transactions are available (e.g., Ethereum), the present application preferably employs a permissioned blockchain network, where the blockchain nodes are operated by known whitelisted entities. The identities for these entities (often defined by public and private key pairs) are granted by an issuing authority on the network. One example of such a permissioned blockchain network is the opensource Hyperledger Fabric. Fabric has a modular architecture that allows network administrators to define their own constraints and then set-up the protocols accordingly. Fabric also provides the following special features, some of which are herein.

Chaincode extends the concept of traditional smart contracts. Apart from providing a mechanism to define assets and instructions (business logic) to modify the assets, chaincode is also immutable, may retain state, and inherits confidentiality/privacy. Networks can limit who can view or interact at different levels of the environment (variable confidentiality). Individual transactions can even impose their own confidentiality rules. While the network can set identity obfuscation, it is possible to have 100% anonymous peers whose identity is also provable and unique with secure cryptographic techniques (variable identification). If the users of a network grant permission, an auditor will be able to de-anonymize users and their transactions. This is useful for regulatory inspection and analysis. The details of a transaction, including but not limited to chaincode, peers, assets, and volumes are encrypted (private transactions). This eliminates any pattern recognition or leaked private information to nonauthorized actors on the network. Only specified actors can decrypt, view and interact/execute (with chaincode). Finally, fabric can easily operate with almost any consensus mechanism.

FIG. 1 illustrates a logic network diagram of a permissioned blockchain system 100, according to example embodiments. Referring to FIG. 1, the system 100 includes one or more vehicles 116, shown as vehicle A 116A through Vehicle I 116I. Vehicles 116 are any type of motor vehicle, including cars, trucks, buses, construction equipment, and so forth. Each vehicle 116 includes one or more sensors 120, identified as sensors 120A associated with vehicle A 116A through sensors 120I associated with vehicle I 116I. Each vehicle 116 includes an associated driver or owner.

Sensors 120 may be of many different types and arrangements. Sensors 120 includes cameras, microphones, light sensors, pressure sensors, speed sensors, accelerometers, and many type of specialty sensors including, but not limited to, airbag deployment sensors, engine RPM sensors, braking sensors, fuel sensors, and so forth. Current cars and trucks often include multiple cameras, such as a front camera, a rear camera, and side cameras. In some embodiments, sensors 120 are part of an intelligent vehicle monitoring system, such as ONSTAR.

Vehicles 116A-116I participate in one or more accidents or incidents. An incident may be a breakdown of a vehicle 116, without being in an accident. An accident may be a single-vehicle 116 accident, where one vehicle 116 strikes a non-vehicular object such as a building, a light pole, or a pedestrian. An accident may alternatively be a multiple-vehicle accident, where a collision occurs between two or more vehicles. Either a single accident or multiple accidents may occur. In response to accidents, vehicles 116 autonomously provide primary data 124 to one or more nodes 104. Primary data from vehicle A 116A is denoted primary data 124A while primary data from vehicle I 116I is denoted primary data 124I. Primary data 124 is always directly associated with vehicles 116. After an accident, other secondary data 132 may be supplied from other sources 128 not directly associated with the vehicles 116 in an accident. The sources 128 may be cameras, etc associated with other drivers not in an accident, bystanders, first responders, or red light or traffic cameras. In some embodiments, sources 128 may also include a mobile computing or other communication device (cell phone, smart phone, PDA, smart watch, etc) used by the driver or other passenger of a vehicle 116 to take pictures or video related to an accident, such as of damage received by a vehicle or injuries to any persons. The secondary data 132 may be any of audio, video, pictures, text, or other forms of data. FIG. 1 shows a video source 128A such as a camcorder or other camera-based device providing video and possibly audio as secondary data 132A and a mobile device 128N providing video, audio, or pictures (i.e. snapshots) as secondary data 132N. Any number of vehicles 116 (one or more) may provide primary data 124, and any number of other sources (including none) 128 may provide secondary data 132.

FIG. 1 illustrates node 104C receiving all primary 124 and secondary 132 data. This is simply an example of one of many ways that primary 124 and secondary 132 data is transferred from vehicles 116 and other sources 128 to a blockchain. In other embodiments, multiple nodes 104 receive primary 124 and secondary 132 data, and act on the data accordingly. In one embodiment, node 104C is a server that receives all primary 124 and secondary 132 data. Server 104C performs the primary processes of the present application, which is described in more detail herein. Each node 104 includes a shared ledger 108, indicated as shared ledger 108A associated with node A 104A, shared ledger 108B associated with node B 104B, shared ledger 108C associated with node C 104C, and shared ledger 108N associated with node N 104N. Shared ledgers 108 store the documents of the present application for access by nodes 104 granted permission by the blockchain network 112 to access them.

In one embodiment, the receiving node(s) 104 are part of an existing blockchain network 112, which includes node A 104A, node B 104B, node C 104C, and node N 104N. In another embodiment, the receiving node(s) 104 create a new blockchain network 112 in response to receiving primary data 124. In this case, a receiving node 104C may create a blockchain network 112 by inviting node A 104A, node B 104B, and node N 104N to join the blockchain network 112. Generally, each of nodes 104 has a role in creating and processing documents related to accidents or incidents involving vehicles 116. For example, nodes 104 may belong to insurance companies for each of the vehicles 116, police, fire, EMS, city services, attorneys, towing companies, body shops or repair facilities, parts suppliers, or any other entities with a responsibility or role in resolving vehicle 116 accidents or incidents. In some embodiments, node 104C may not be the server as described herein (i.e. the server is a different node 104), and at least has the role of receiving and forwarding all primary 124 and secondary 132 data to the server. For incidents that are not accidents (such as the breakdown of a single vehicle), the process of the present application may provide a simpler blockchain network 112 not requiring many of the nodes 104 corresponding to accidents. For example, police, fire, EMS, attorneys, and city services may not be required. However, even though a simpler blockchain network 112 may be used, all of the inherent blockchain advantages of immutability, a shared distributed ledger 108, and peer transaction validation are still present.

Figure 2A:
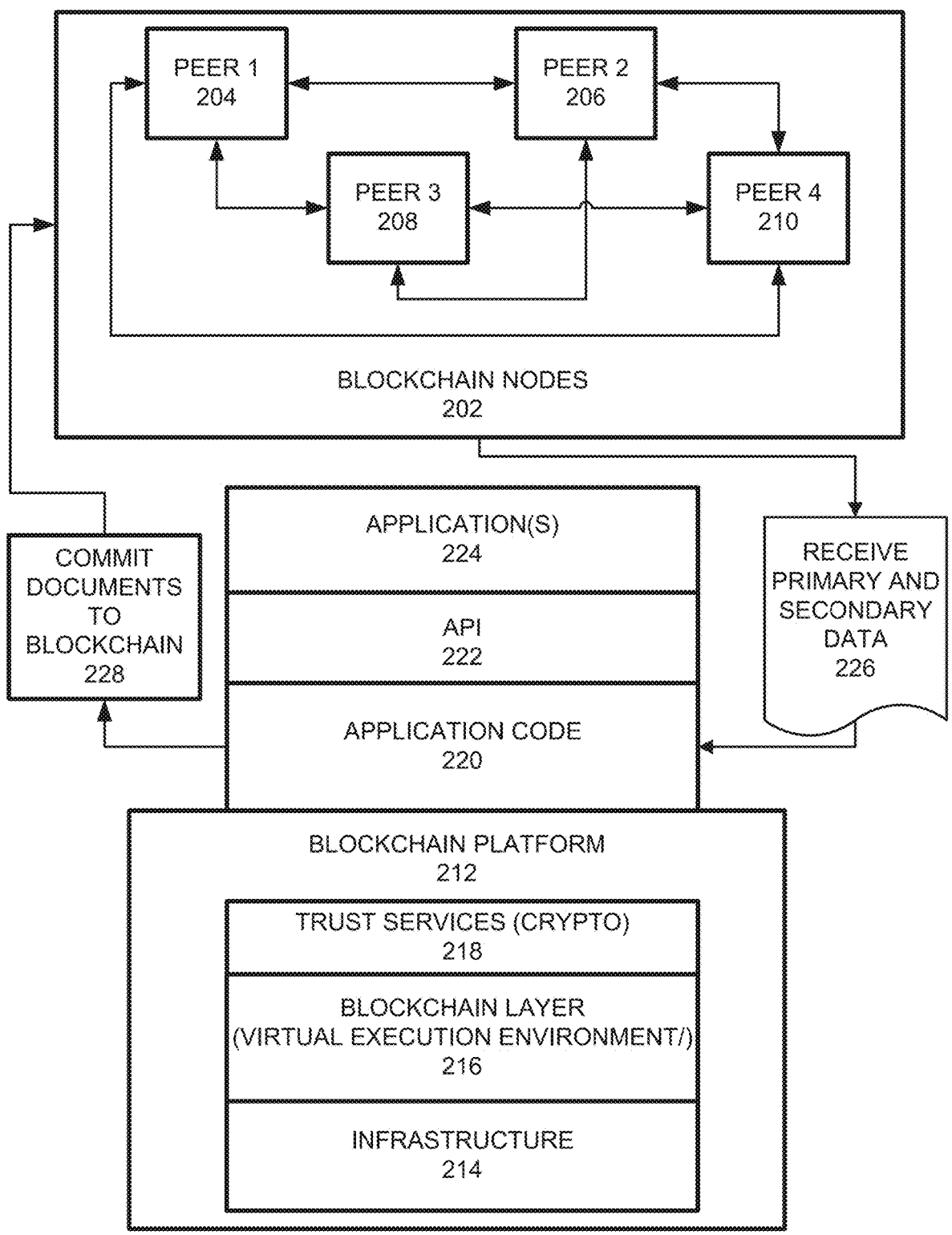
FIG. 2A illustrates an example peer node blockchain architecture configuration for an asset sharing scenario, according to example embodiments.

FIG. 2A illustrates a blockchain system architecture configuration 200, according to example embodiments. Referring to FIG. 2A, blockchain architecture 200 may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-281 may receive primary 124 and secondary 132 data for all blockchain nodes in the architecture 200. A blockchain node may initiate a blockchain authentication and seek to write to a blockchain immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, primary 124 and secondary 132 data may be received 226 from nodes or peers 204-210 and may be processed by one or more processing entities (e.g., virtual machines) included in the blockchain layer 220. The result 228 may commit documents that are provided to blockchain nodes 202 to access.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, documents 228 are committed to the blockchain nodes 202 as part of processes to allow blockchain nodes 202 to access needed documents.

Figure 2B:
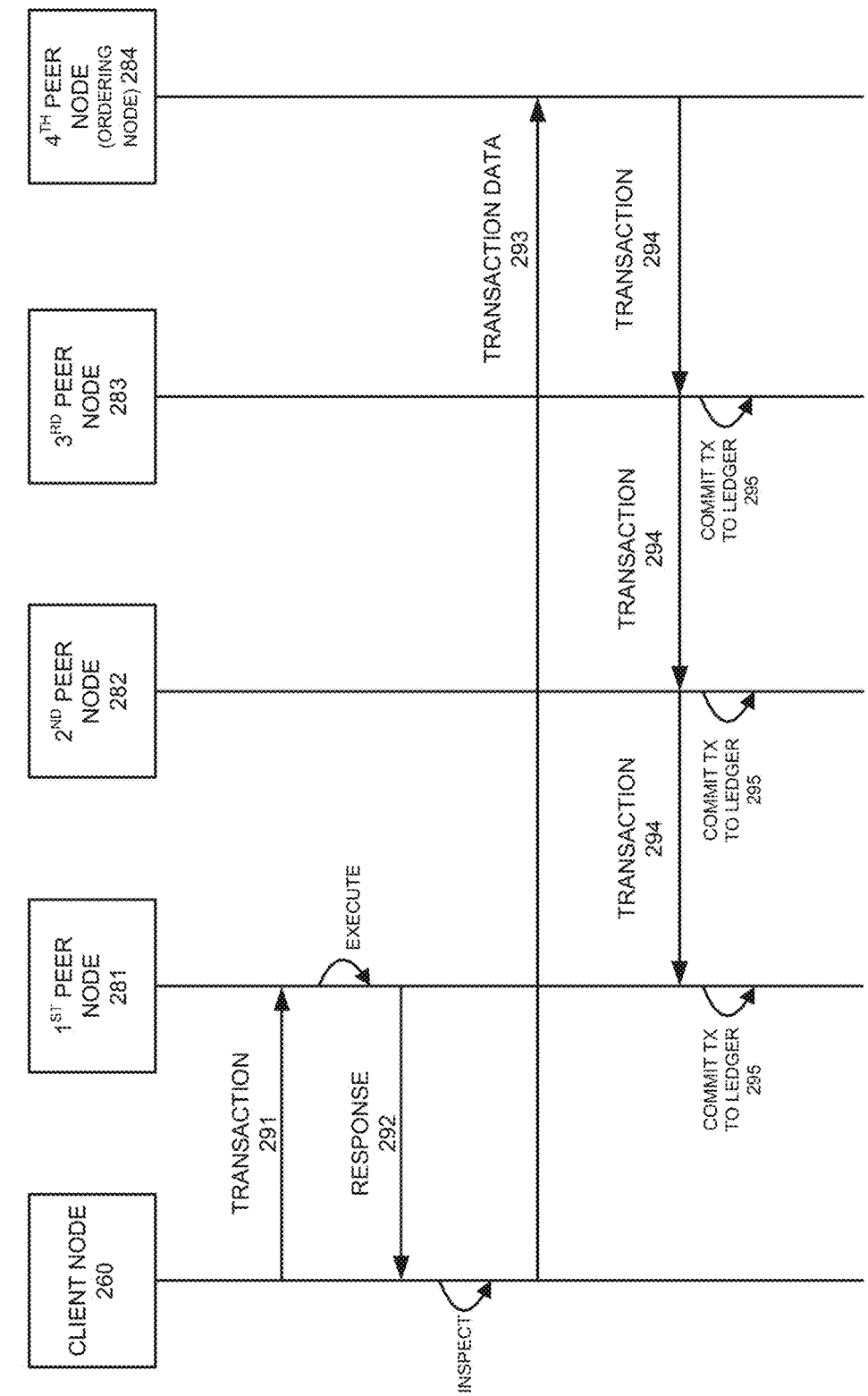
FIG. 2B illustrates an example of a transactional flow between nodes of the blockchain, according to example embodiments.

FIG. 2B illustrates an example of a transactional flow 250 between nodes of the blockchain in accordance with an example embodiment. Referring to FIG. 2B, the transaction flow 250 may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client node 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers or nodes 281-283 may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client node 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client node 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client node 260 which parses the payload for the application to consume.

In response, the application of the client node 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client node 260 may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by nodes and upheld at the commit validation phase.

After successful inspection, in step 293 the client node 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
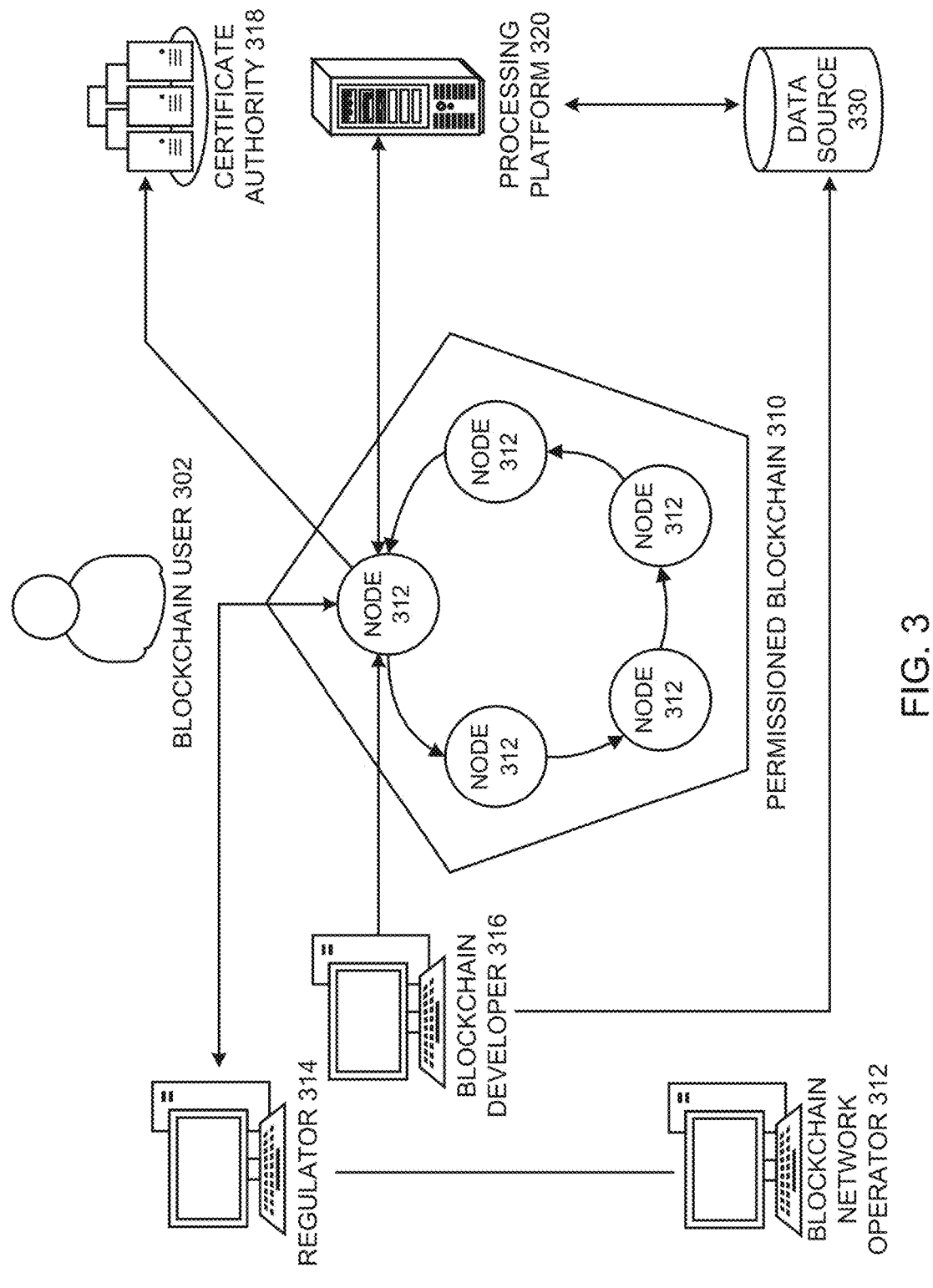
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
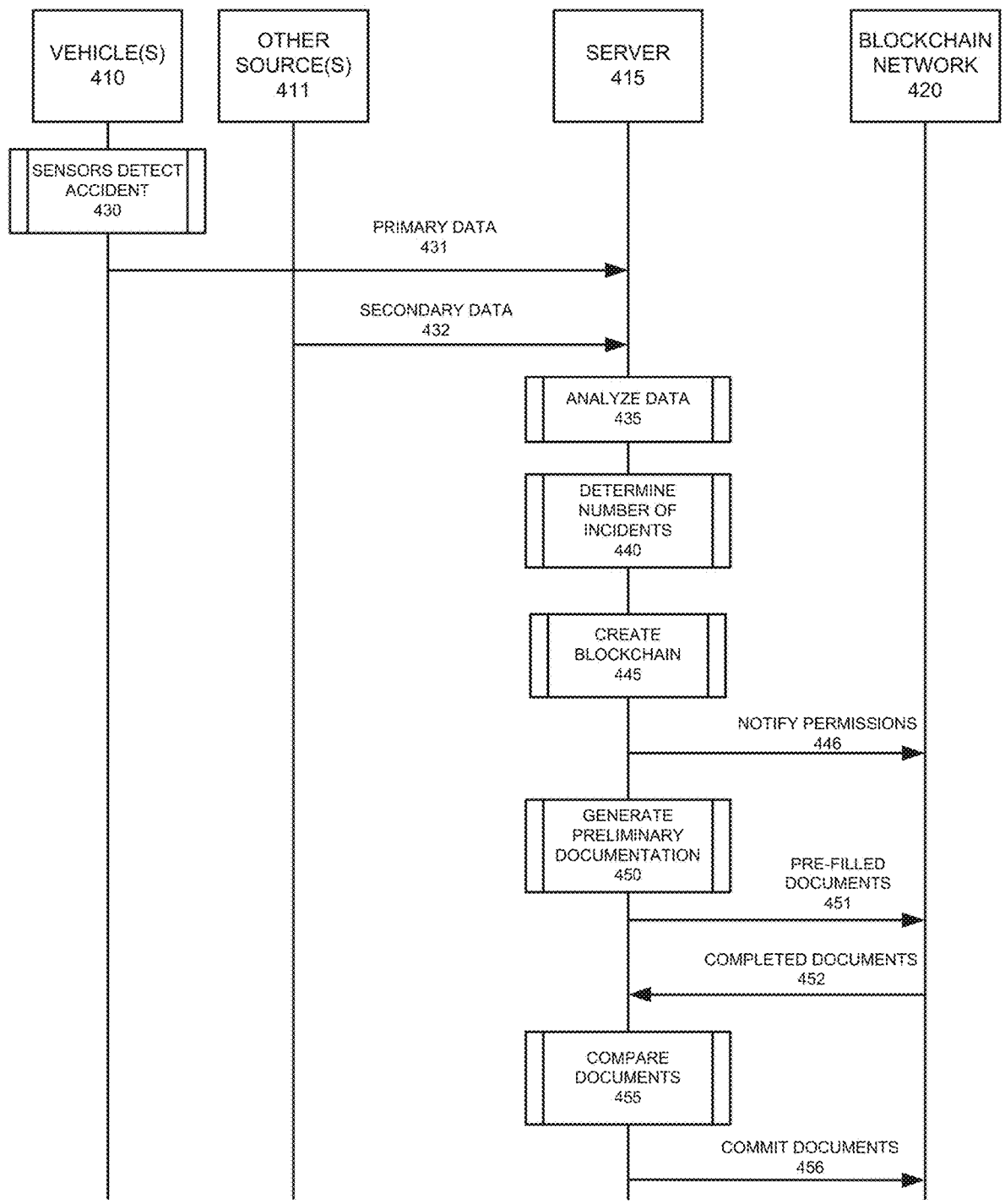
FIG. 4 illustrates a system messaging diagram for performing vehicle incident analysis and documentation, according to example embodiments.

FIG. 4 illustrates a system messaging diagram for performing vehicle incident analysis and documentation, according to example embodiments. Referring to FIG. 4, the system diagram 400 includes a vehicle or vehicles 410, other data sources 411, a server 415, and a blockchain network 420. Vehicle or vehicles 410 begins the process by participating in an accident or incident. A single vehicle 410 may provide all the primary data 431, such as when a single vehicle 410 hits an obstacle or other object or breaks down, or multiple vehicles 410 may provide the primary data 431, such as during/after a multi-vehicle 410 accident or multiple different accidents occurring within the same area or within a same timeframe.

The vehicle or vehicles 410 include various sensors 120 that provide data outputs to a server (a node in the blockchain network 420). In one embodiment, the server 415 is the node 104 that receives data from vehicles 410 and other sources 411. In another embodiment, a node 104 different from the server 415 receives data from vehicles 410 and other sources 411 and responsively provides the received data to the server 415. The sensors 120 are additionally able to detect the occurrence of an accident or incident, and either implicitly provide that as part of providing primary data 431 to the server 415, or as an additional data component of primary data 431. Primary data 431 may also include supplementary data such as a video output of a personal video recorder (e.g. dashcam) in a vehicle 410.

In some embodiments, secondary data 432 from other sources 411 is provided to the server 415 unsolicited. In other embodiments, after receiving primary data 431, the server 415 solicits the other sources 411 for the secondary data 432, and the other sources 411 responsively transfer the secondary data 415 to the server 415. The other sources 411 include other vehicles not participating in the accident (such as emergency vehicles or other passenger vehicles), traffic cameras, dash cameras, body-worn cameras, mobile devices or smartphones of other individuals (including drivers of the vehicles 410), satellite imagery, traffic sensors, etc. A user participating in an incident may additionally upload pictures or video of damages incurred as secondary data 432 to the server 415. The secondary data 432 may include any combination of snapshots, video, audio, text messages, emails, magnetic data, infrared or ultraviolet data, Doppler data, or any other type of camera, sensor, or user-supplied data.

After receiving the primary 431 and secondary 432 data, the server 415 analyzes the data 435. In one embodiment, the server 415 represents one or more conventional servers running a conventional or a distributed application. In a preferred embodiment, the server 415 represents a cognitive system, such as the IBM WATSON intelligent learning system. Cognitive systems are not only able to analyze sensor data in advance of extracting information and filling out forms, but may have additional capabilities including determining the cause of an accident based on primary 431 and secondary 432 data and assigning the blame to vehicle 410 operators. Cognitive systems may include visual recognition applications to assist in analyzing video data to identify objects and determine subjects involved with an incident. Additionally, visual recognition applications may be able to verify or change a determination of which vehicles 410 are involved in an accident or incident. For example, if one or more vehicles 410 was not involved in the same incident (i.e., a wrong prediction was made earlier), the data can be split into two separate incidents and each incident may continue to be analyzed separately. If only one vehicle 410 was assumed to be a participant in an accident and the visual recognition application detects another vehicle 410, data from that vehicle 410 will be combined into a single accident entry.

In some embodiments, the cause of an accident or blame determination may be able to be made by the server 415 or cognitive system without receiving or analyzing secondary data 432. In some embodiments, the server 415 or cognitive system makes recommendations to analysts or claim adjusters, and receive a final cause/blame determination from the analysts or claim adjusters. Video analysis may look for infractions such as one vehicle 410 running a red light, speeding, not stopping at a stop sign, not yielding at a yield sign, etc.

After the primary 431 and secondary 432 data has been analyzed, the server 415 determines a number of incidents 440. Primary 431 data may indicate that multiple vehicles 410 are providing data within a similar timeframe or within the same general area. Although this may indicate the multiple vehicles 410 as being participants to the same incident, in many cases the multiple vehicles 410 may be part of separate accidents not directly related to each other. For example, a first vehicle 410 may be involved in a collision with a second vehicle 410 while a third vehicle 410 impacts a building or property down the same street. In one embodiment, primary data 431 includes time stamps from each vehicle 410. If the time stamps from primary data 431 for multiple vehicles 410 is more than a predetermined time window, for example 1 minute, 10 minutes, or 1 hour, it may be reasonably assumed the primary data 431 for the multiple vehicles 410 reflects different accidents. In another embodiment, primary data 431 includes location data (e.g., GPS coordinates) from each vehicle 410. If the location data from primary data 431 for multiple vehicles 410 is less than a predetermined distance, for example 10 meters or 100 meters, it may be reasonably assumed the primary data 431 for the multiple vehicles 410 reflects the same incident.

Even if such time/distance checks produces a conclusion that multiple vehicles 410 have been in a same or different accidents, secondary data 432 may be used in some embodiments to either confirm or change a conclusion on the same or multiple accidents. For example, if review of primary data 431 indicates that three vehicles 410 have been included in the same accident due to same timeframe and proximity, additional camera video from secondary data 432 may clarify that two separate and unrelated accidents have occurred instead of one common accident.

The server 415 next creates a blockchain 445 for the determined incidents. The blockchain network 112 includes all relevant nodes 104, which may include, for example, the server 415, a police department, a fire department, EMS, city public works, insurance companies for each involved party, towing companies, car repair services, law firms or attorneys, the drivers themselves, and other stakeholders in the incident, evaluation, and post-incident processing. In one embodiment, a new blockchain is created based on receipt of the primary data 431. In another embodiment, an already existing blockchain is created based on receipt of the primary data 431. It should be noted that if a new blockchain is created 445, the actual creation may occur in a different order than shown in FIG. 4. For example, creating the blockchain 445 may occur just after receiving the primary data 431, or up to the point shown in FIG. 4.

Once the blockchain has been created 445, the server 415 notifies each of the blockchain nodes 104 of the permissions 446 granted. Not all nodes 104 require access to all documents that will eventually be stored on the blockchain. For example, drivers of the vehicles 410 involved in a same incident may be allowed to see contact information for the other driver(s) as well as identification of the other insurance companies involved, but may not be allowed to see reports from insurance adjusters or analysis of cause/blame for the accident. Access to the blockchain may also be given to the police, insurance companies, and previously used body shops/mechanics, etc. In some embodiments, some of these additional parties may be granted access later (e.g., a mechanic may be given access to the blockchain later because the user may not know one initially).

The process next generates preliminary documentation 450. The server 415 extracts first information from primary data 431 and second information from secondary data 432. The first and second information is used to pre-fill documentation for each accident or incident. Pre-filled documentation may include, but is not limited to, a pre-filled police report or a pre-filled insurance claim. The cognitive system may make a prediction of what could be damaged on one or more vehicles 410 based on comparison of the current damages to previously observed damages and may provide estimates on costs to fix one or more vehicles 410.

The first information may include a date and time, a location, one or more Vehicle Identification Numbers (VIN), one or more vehicle descriptions (year, make, model, etc), sensor data (video, snapshots, audio, engine RPM information, accelerometer readings, vehicle speeds, temperatures, humidity, ambient light levels, acceleration/deceleration information, and any other information derived from primary data 431. First information may also include identification of the drivers or passengers for any involved vehicles 410, insurance carrier identification, and insurance agents name and contact information. In one embodiment, first information may already be known if users have created an account, or involved in a prior incident.

In response to receiving the pre-filled documents 451, nodes 104 of the blockchain network 420 fill in missing information and provide completed documents 452 to the server 415. The nodes 104 with access to the blockchain may also approve, change, or add to what is in the pre-filled documentation. This advantageously makes the process easier for those who may need to fill out documentation yet still allows human interaction to verify that documents are being filled out properly.

For embodiments where the server 415 is a cognitive system, the ability to more accurately pre-fill documentation 450 may improve over time by comparing the completed documents to the pre-filled documents 455 and learn/improve based on changes between the documents. Finally, the server 415 commits the documents 456 to the blockchain ledger and the documents are able to be accessed by nodes 104 having permission to access the documents.

Figure 5A:
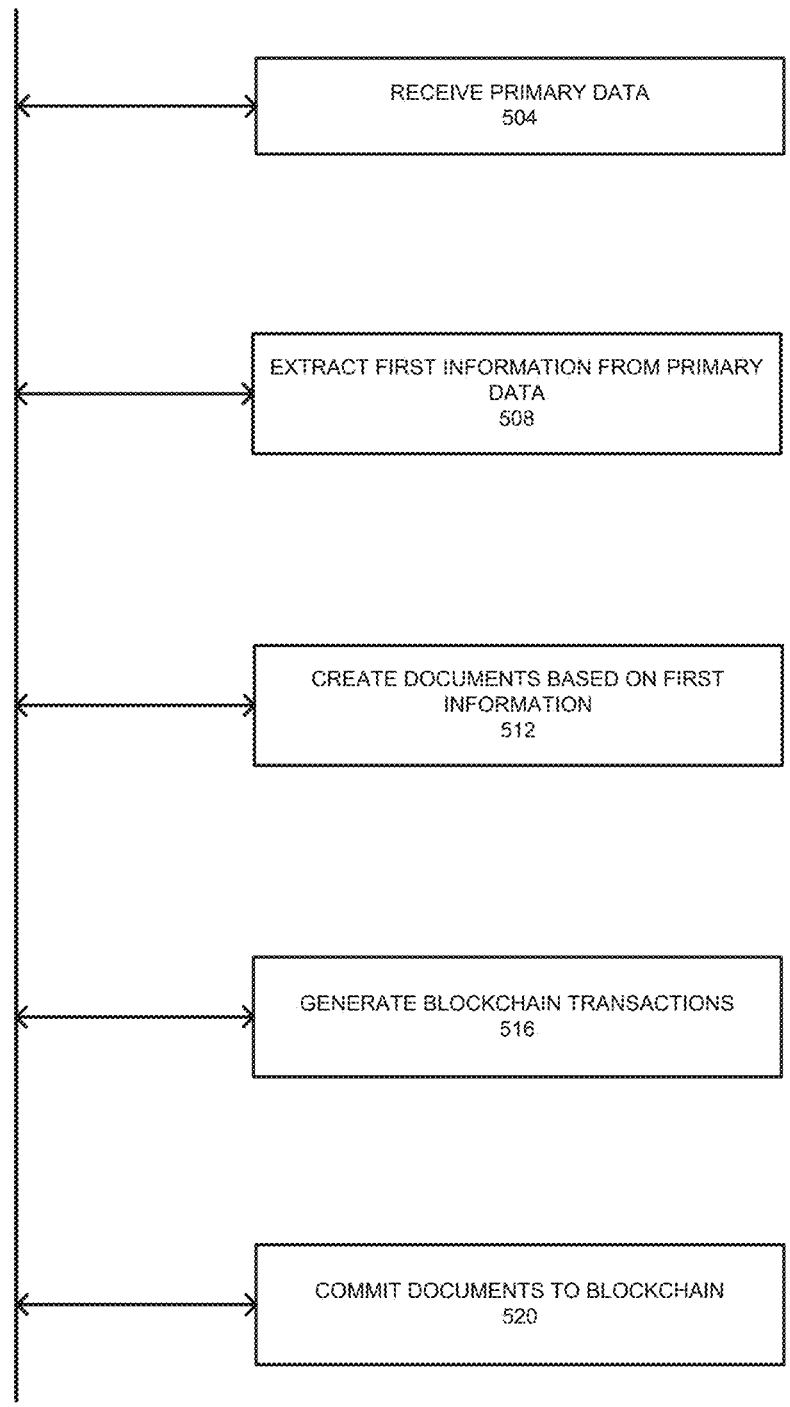
FIG. 5A illustrates a flow diagram of an example method of creating and committing documents to a blockchain, according to example embodiments.

FIG. 5A illustrates a flow diagram of an example method of creating and committing documents to a blockchain, according to example embodiments. Referring to FIG. 5A, the method 500 may include the server receiving primary data from one or more vehicles 504. After receiving the primary data, the server extracts first information from the primary data 508. The server then creates documents based on the first information 512. The documents are pre-filled from the first information and possibly from second information extracted from secondary data as described herein. The server generates one or more blockchain transactions to distribute pre-filled documents to stakeholder nodes 516, and received completed documents back from the stakeholder nodes (i.e. the stakeholder nodes may have additional information the server does not have). Once the server has the completed documents, the server commits the completed documents to the blockchain 520. Once documents have been committed to the blockchain, permissioned nodes may access the appropriate documents.

Figure 5B:
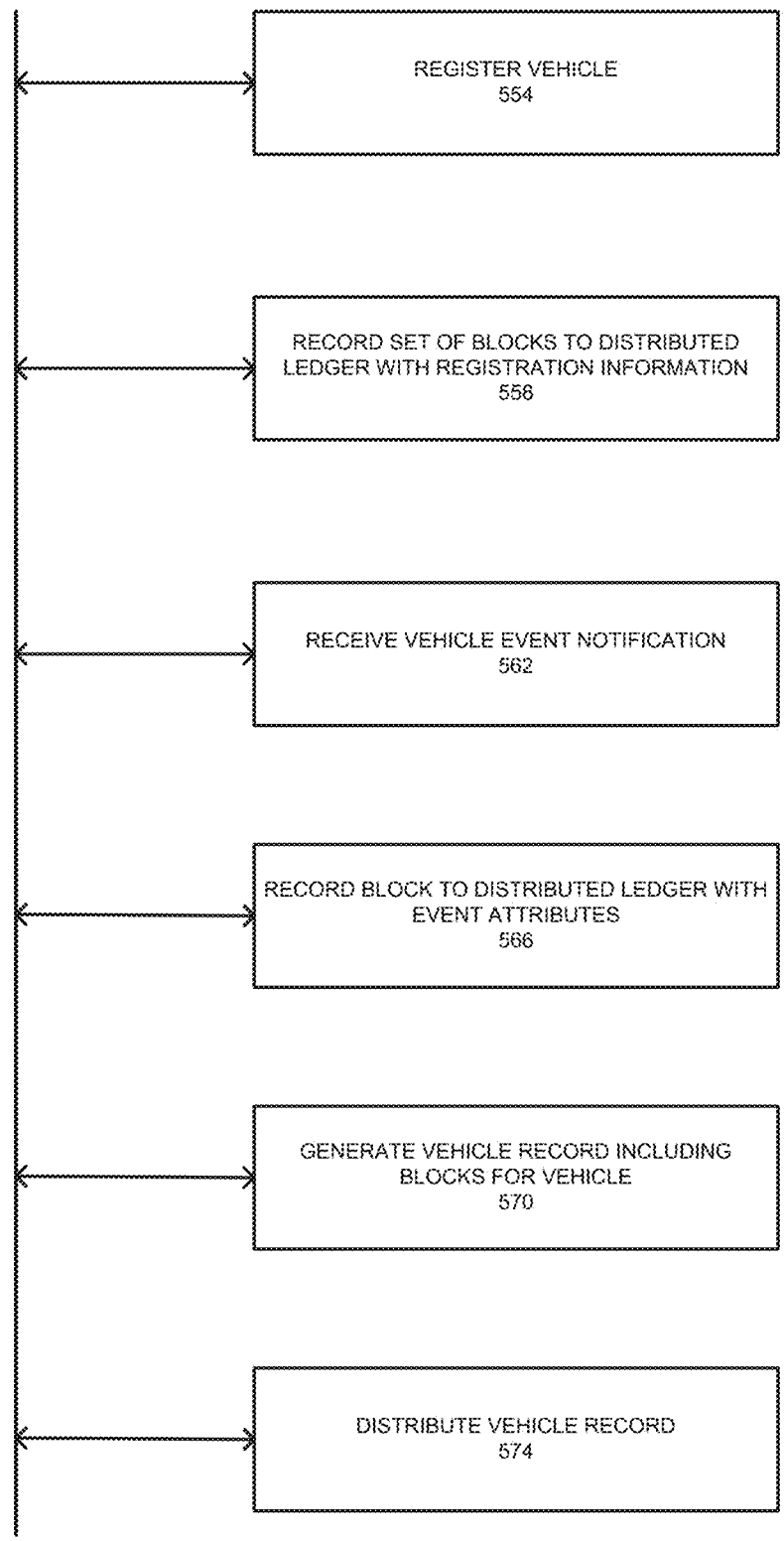
FIG. 5B illustrates a flow diagram of an example method of documenting vehicle data on a blockchain, according to example embodiments.

FIG. 5B illustrates a flow diagram of an example method of documenting vehicle data on a blockchain, according to example embodiments. The method may include registering a vehicle, at block 554. Registering a vehicle associates an owner and address with a vehicle description and Vehicle Identification Number (VIN).

At block 558, a set of blocks on a blockchain are recorded with the vehicle registration information, including ownership attributes for the owner, permission attributes for a vehicle record, and the Vehicle Identification Number (VIN). The set of blocks are stored in the distributed ledger of the blockchain.

At block 562, a vehicle event notification is received. The vehicle event may be a service event for the vehicle including repair attributes, a vehicle accident event for the vehicle including accident attributes, a manufacturer recall event including recall attributes, or a registration event for the vehicle.

At block 566, a new block on the blockchain is recorded to the distributed ledger including the event attributes for the vehicle. In this way, the blockchain is updated continuously with new vehicle event information for the same vehicle. Over time, this documents a vehicle history within a blockchain, up to a present time.

At block 570, a vehicle record is generated, including the set of blocks created upon registration, and the additional block corresponding to the vehicle event occurring after registration. Each block of the vehicle record includes the vehicle's Vehicle Identification Number (VIN).

At block 574, the vehicle record is distributed to an interface, an enterprise system, or an external system.

Figure 6A:
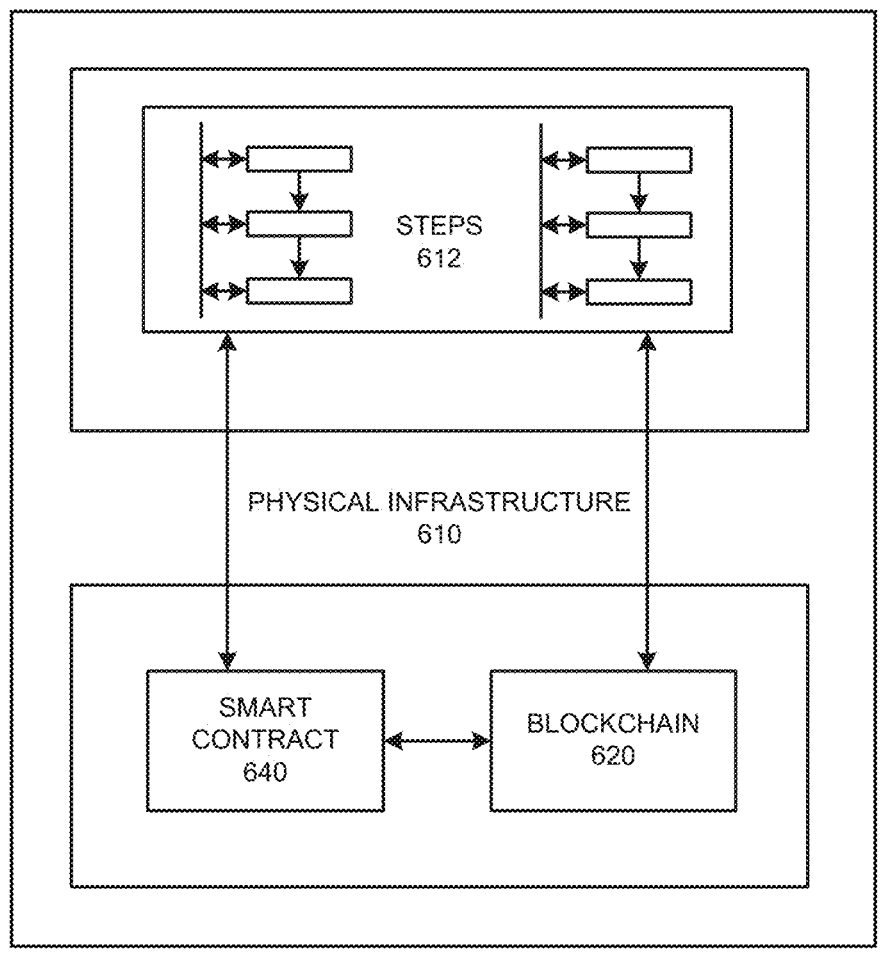
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
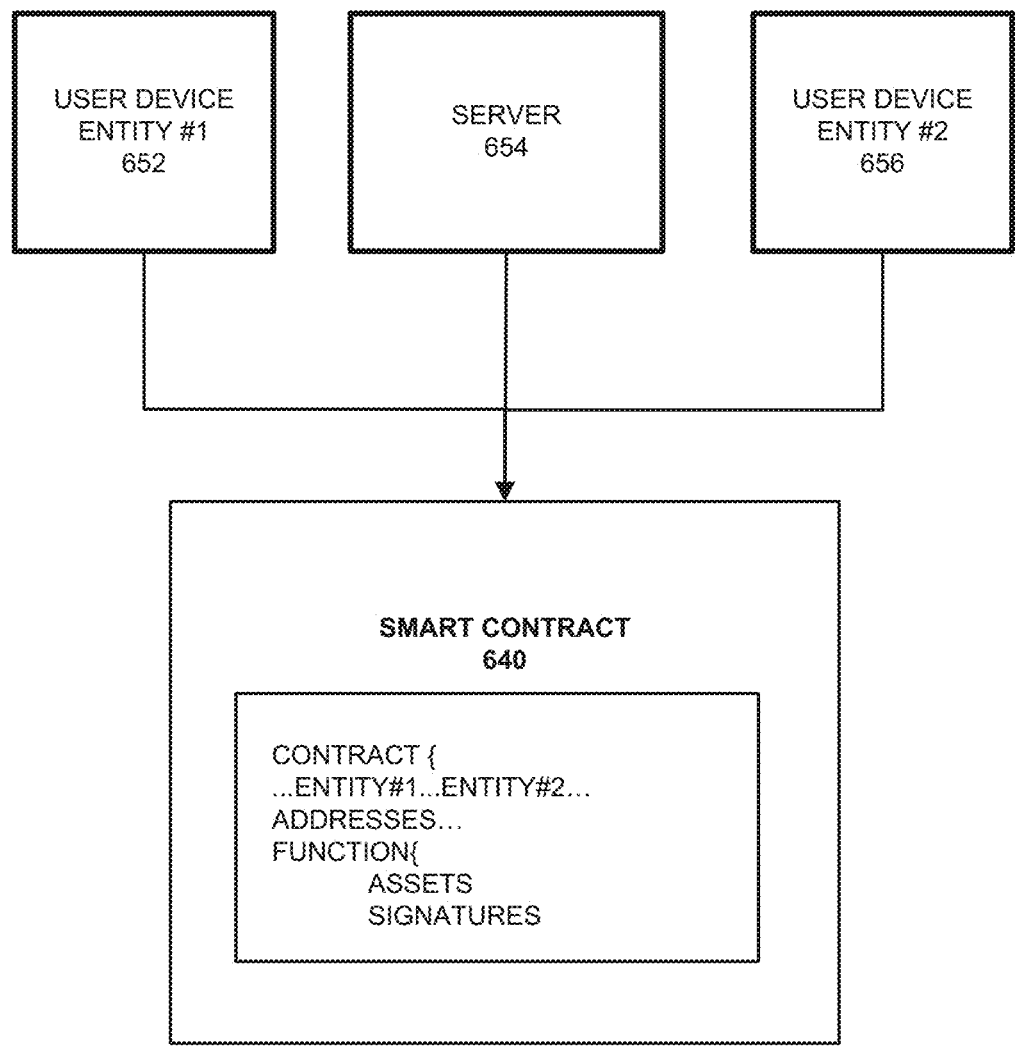
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
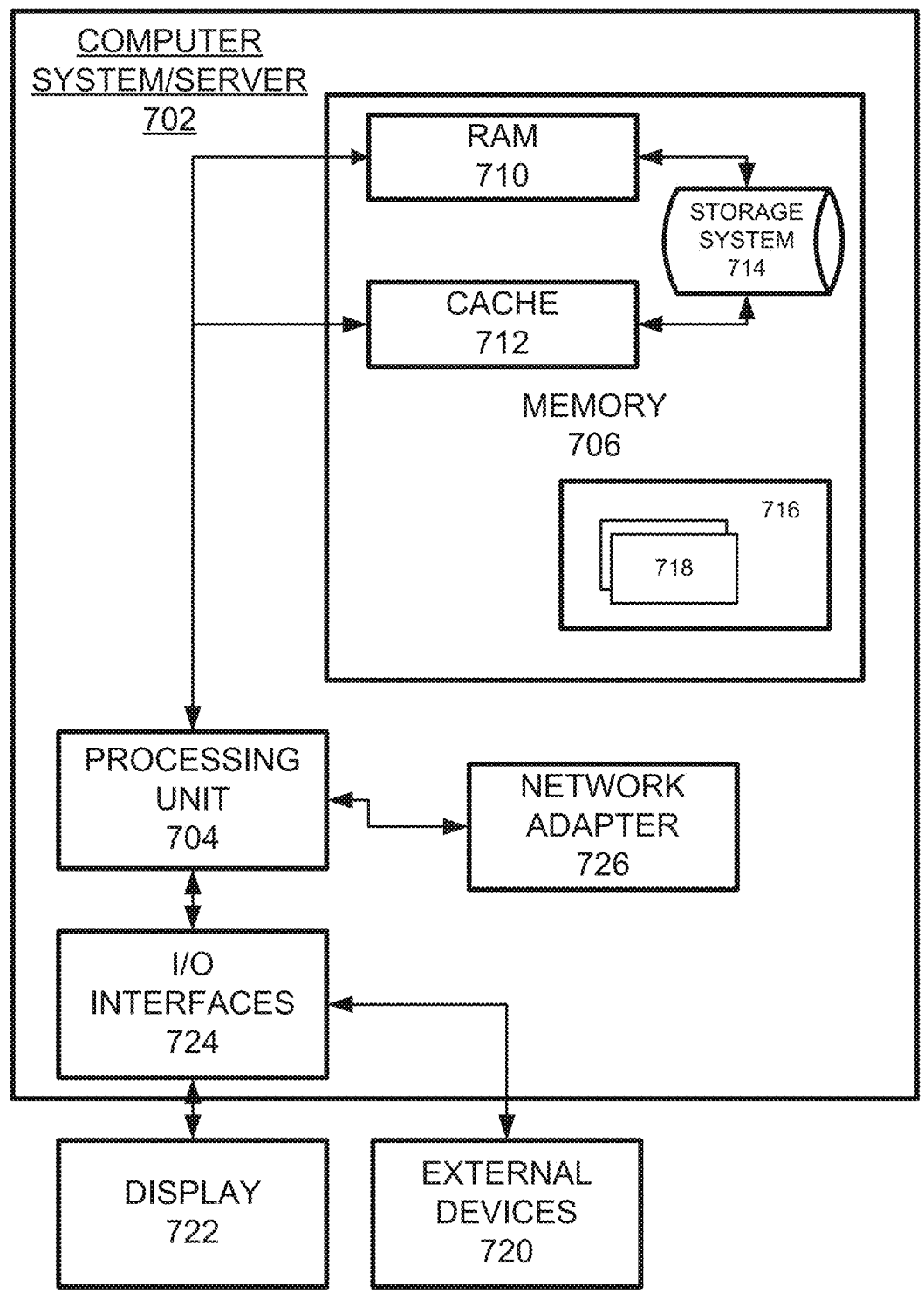
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include one or more program products having a set (e.g., one or more) of program modules that are configured to carry out the functions of various embodiments of the application.

Program/utility 716, having a set (one or more) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a network interface configured to receive data from one or more sensors of one or more vehicles involved in an event; and
a processor configured to:
solicit one or more of a traffic camera and another vehicle that was not involved in the event for additional image data associated with the event, and in response, receive the additional image data associated with the event;
determine whether the event is a single event or multiple events based on timestamps included in the data received from the one or more sensors;
verify the determination of whether the event is a single event or multiple events based on the additional image data received from the one or more of the traffic camera and the other vehicle;
generate one or more new blockchain ledgers based on the verified determination;
invite members to the one or more new blockchain ledgers based on external parties associated with the one or more vehicles involved in the event;
determine a number of accidents based on a difference in timestamps within data received from multiple vehicles; and
assign one or more specific vehicles to each accident of the number of accidents;
wherein the processor further determines the number of accidents based on distance information in the data received from the one or more sensors.

2. The system of claim 1, wherein:
the processor is further configured to:
receive secondary data of the event from sources other than the one or more vehicles; and
extract second information from the secondary data.

3. The system of claim 1, wherein the processor is further configured to:

determine one or more of a cause and a blame for the event; and
transmit a recommendation of one or more of the cause and the blame for the event to an adjuster.

4. The system of claim 1, wherein the processor is further configured to create a completed document by filling in missing information of a partially completed document created by another blockchain peer.

5. The system of claim 1, wherein the event comprises at least one accident and at least one failure of the one or more vehicles.

6. A method, comprising:
receiving data from one or more sensors of one or more vehicles involved in an event;
soliciting one or more of a traffic camera and another vehicle that was not involved in the event for additional image data associated with the event, and in response, receiving the additional image data associated with the event;
determining whether the event is a single event or multiple events based on timestamps included in the data received from the one or more sensors;
verifying the determination of whether the event is a single event or multiple events based on the additional image data received from the one or more of the traffic camera and the other vehicle;
generating one or more new blockchain ledgers based on the verified determination;
inviting members to the one or more new blockchain ledgers based on external parties associated with the one or more vehicles involved in the event,
wherein a number of accidents based on a difference in timestamps within data received from multiple vehicles is determined, and
wherein one or more specific vehicles is assigned to each accident of the number of accidents;
wherein the number of accidents based on distance information in the data received from the one or more sensors is determined.

7. The method of claim 6, further comprising:
receiving secondary data of the event from sources other than the one or more vehicles; and
extracting second information from the secondary data.

8. The method of claim 6, wherein the method further comprises creating a completed document by filling in missing information of a partially completed document created by another blockchain peer.

9. The method of claim 6, wherein the event comprises at least one accident and at least one failure of the one or more vehicles.

10. The method of claim 6, further comprising:
determining one or more of a cause and a blame for the event; and
transmitting a recommendation of one or more of the cause and the blame for the accident to an adjuster.

11. A non-transitory computer readable medium comprising instructions, that when read by a processor, cause the processor to perform a method comprising:
receiving data from one or more sensors of one or more vehicles involved in an event;
soliciting one or more of a traffic camera and another vehicle that was not involved in the event for additional image data associated with the event, and in response, receiving the additional image data associated with the event;

determining whether the event is a single event or multiple events based on timestamps included in the data received from the one or more sensors;

verifying the determination of whether the event is a single event or multiple events based on the additional image data received from the one or more of the traffic camera and the other vehicle;

generating one or more new blockchain ledgers based on the verified determination;

receiving, via the blockchain peer, one or more completed documents corresponding to the one or more partially pre-filled documents which are filled in by one or more other blockchain peers of the blockchain;

wherein a number of accidents based on a difference in timestamps within data received from multiple vehicles is determined; and wherein one or more specific vehicles is assigned to each accident of the number of accidents, wherein the number of accidents based on distance information in the data received from the one or more sensors is determined.

12. The non-transitory computer readable medium of claim 11, wherein the method further comprises:

receiving secondary data of the event from sources other than the one or more vehicles; and extracting second information from the secondary data.

13. The non-transitory computer readable medium of claim 11, wherein the method further comprises creating a completed document by filling-in missing information in a partially completed document created by another blockchain peer.

14. The non-transitory computer readable medium of claim 11, wherein the event comprises at least one accident and at least one failure of the one or more vehicles.

15. The non-transitory computer readable medium of claim 11, wherein the method further comprises:

determining one or more of a cause and a blame for the event; and transmitting a recommendation of one or more of the cause and the blame for an accident to an adjuster.

* * * * *